(12) United States Patent
Spoerke et al.

(10) Patent No.: US 11,545,723 B2
(45) Date of Patent: Jan. 3, 2023

(54) SODIUM ELECTROCHEMICAL INTERFACES WITH NASICON-TYPE CERAMICS

(71) Applicant: National Technology & Engineering Solutions of Sandia, LLC, Albuquerque, NM (US)

(72) Inventors: Erik David Spoerke, Albuquerque, NM (US); Martha Gross, Albuquerque, NM (US); Stephen Percival, Albuquerque, NM (US); Mark A. Rodriguez, Albuquerque, NM (US); Leo J. Small, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 24 days.

(21) Appl. No.: 17/104,306

(22) Filed: Nov. 25, 2020

(65) Prior Publication Data

US 2021/0167462 A1 Jun. 3, 2021

Related U.S. Application Data

(60) Provisional application No. 62/940,697, filed on Nov. 26, 2019.

(51) Int. Cl.
*H01M 50/449* (2021.01)
*H01M 10/054* (2010.01)
*H01M 50/434* (2021.01)

(52) U.S. Cl.
CPC ........ *H01M 50/449* (2021.01); *H01M 10/054* (2013.01); *H01M 50/434* (2021.01)

(58) Field of Classification Search
CPC .................. H01M 10/054; H01M 50/449
See application file for complete search history.

(56) References Cited

U.S. PATENT DOCUMENTS 6,235,183 B1    5/2001  Putter et al.
8,088,270 B2    1/2012  Gordon et al.
2010/0331170 A1† 12/2010 Balagopal
(Continued)

FOREIGN PATENT DOCUMENTS

WO    WO2015048294 A1 †  4/2015
WO    WO2017190135 A1 † 11/2017

OTHER PUBLICATIONS

Small, L. J. et al., "Next Generation Molten NaI Batteries for Grid Scale Energy Storage," Journal of Power Sources (2017), vol. 360, pp. 569-574.
(Continued)

*Primary Examiner* — Stephan J Essex
(74) *Attorney, Agent, or Firm* — Kevin W. Bieg (57) ABSTRACT

The present invention is directed to the modification of sodium electrochemical interfaces to improve performance of NaSICON-type ceramics in a variety of electrochemical applications. Enhanced mating of the separator-sodium interface by means of engineered coatings or other surface modifications results in lower interfacial resistance and higher performance at increased current densities, enabling the effective operation of molten sodium batteries and other electrochemical technologies at low and high temperatures.

12 Claims, 10 Drawing Sheets

Na-NaI battery:
$Na \rightarrow Na^+ + e^-$  $E^0 = 0V$
$I_3^- + 2e^- \rightarrow 3I^-$  $E^0 = 3.24$
$2Na + I_3^- \rightarrow 2Na^+ + 3I^-$  $E^0_{net} = 3.24V$

(56) References Cited

U.S. PATENT DOCUMENTS

2013/0183546 A1† 7/2013 Joshi

OTHER PUBLICATIONS

Chang, H-J. et al., "'Ni-Less' Cathodes for High Energy Density, Intermediate Temperature Na-NiCl$_2$ Batteries," Advanced Materials Interfaces (2018), vol. 5, 1701592, 8 pages.

Hueso, K. B. et al., "High Temperature Sodium Batteries: Status, Challenges and Future Trends," Energy & Environmental Science (2013), vol. 6, pp. 734-749.

Hueso, K. B. et al., "Challenges and Perspectives on High and Intermediate-Temperature Sodium Batteries," Nano Research (2017), vol. 10, pp. 4082-4114.

Ahlbrecht, K. et al., "Investigation of the Wetting Behavior of Na and Na Alloys on Uncoated and Coated Na-β"—Alumina at Temperatures Below 150 °C, Ionics (2017), vol. 23, pp. 1319-1327.

Holzapfel, M. et al., "Medium-Temperature Molten Sodium Batteries with Aqueous Bromine and Iodine Cathodes," Electrochimica Acta (2017), vol. 237, pp. 12-21.

Lu, X. et al., "Liquid-Metal Electrode to Enable Ultra-Low Temperature Sodium-Beta Alumina Batteries for Renewable Energy Storage," Nature Communications (2014), vol. 5:4578, 8 pages.

Reed, D. et al., "Wetting of Sodium on B"-Al$_2$O$_3$/YSZ Composites for Low Temperature Planar Sodium-Metal Halide Batteries," Journal of Power Sources (2013), vol. 227, pp. 94-100.

Hu, Y. et al., Nickel Nanowire Network Coating to Alleviate Interfacial Polarization for Na-Beta Battery Applications, Journal of Power Sources (2013), vol. 240, pp. 786-795.

Hu, Y. et al., "Low-Cost Shape-Control Synthesis of Porous Carbon Film on B"—Alumina Ceramics for Na-Based Battery Application," Journal of Power Sources (2012), vol. 219, pp. 1-8.

Hu, Y. et al., "Porous Iron Oxide Coating on β"—Alumina Ceramics for Na-Based Batteries," Solid State Ionics (2014), vol. 262, pp. 133-137.

Chang, H-J. et al., "Decorating β"—Alumina Solid-State Electrolytes with Micron Pb Spherical Particles for Improving Na Wettability at Lower Temperatures," Journal of Materials Chemistry A (2018), vol. 6, pp. 19703-19711.

Jin, D. et al., "Bismuth Islands for Low-Temperature Sodium-Beta Alumina Batteries," ACS Applied Materials & Interfaces (2019), vol. 11, pp. 2917-2924.

Liu, H. et al., "Alloy Anodes for Rechargeable Alkali-Metal Batteries: Progress and Challenge," ACS Materials Letters (2019), vol. 1, pp. 217-229.

Wang, C. et al., "Universal Soldering of Lithium and Sodium Alloys on Various Substrates for Batteries," Advanced Energy Materials (2018), vol. 8, 1701963, 8 pages.

Song, S. et al., "A Na+ Superionic Conductor for Room-Temperature Sodium Batteries," Scientific Reports (2016), vol. 6, 32330, 10 pages.

Xue, L. et al., "Ionic Liquid Redox Catholyte for High Energy Efficiency, Low-Cost Energy Storage," Advanced Energy Materials (2015), vol. 5, 1500271, 8 pages.

Matios, E. et al., "Graphene Regulated Ceramic Electrolyte for Solid-State Sodium Metal Battery with Superior Electrochemical Stability," ACS Applied Materials & Interfaces (2019), vol. 11, pp. 5064-5072.

U.S. Appl. No. 16/564,751, filed Sep. 9, 2019, entitled Molten Inorganic Electrolytes for Low Temperature Sodium Batteries.

Ma, Q. and Tietz, F., "Solid-State Electrolyte Materials for Sodium Batteries: Towards Practical Applications," ChemElectroChem (2020), vol. 7, pp. 2693-2713.

Scheetz, B.E. et al., "Sodium Zirconium Phosphate (NZP) as a Host Structure for Nuclear Waste," Waste Management (1994), vol. 14, pp. 489-505.

Balogopal, S., "Heat Engines", Ceramatec technical document, 3 pages.

Guo, Y., "Mixed Ionic and Electronic Conducting Electrode Studies for an Alkali Metal Thermal to Electric Converter," Ph.D. Dissertation submitted to Office of Graduate Studies of Texas A&M University (2006), 207 pages.

Kurath, D.E. et al., "Salt Splitting Using Ceramic Membranes," Separation Science and Technology (1997), vol. 32, pp. 557-572.

Gordon, J.H. (Ceramatec Inc.), Post Retort, Pre Hydro-treat Upgrading of Shale Oil, Oil & Natural Gas Technology Final Report (DOE Award No. DE-FE0000408), Jan. 25, 2013.

Schettler, H. et al., "Investigation of Solid Sodium Reference Electrodes for Solid-State Electrochemical Gas Sensors," Appl. Phys. A, 57 (1993), pp. 31-35.

Kim, C. et al., "A High Rate and Long-Cycle-Life Anode Based on Micrometer-sized Pb Powder for Sodium-ion Batteries, Journal of Alloys and Compounds," vol. 886 (2021), 8 pages.

Jing, W. T. et al., "Recent Progress on Metallic Sn- and Sb-based anodes for Sodium-ion Batteries," Journal of Materials Chemistry A, vol. 8 (2020), pp. 2913-2933.

Wang, C. et al., "Bulk Bismuth as a High-Capacity and Ultralong Cycle-Life Anode for Sodium-ion Batteries by Coupling with Glyme-Based Electrolytes," Advanced Materials, vol. 29, 1702212 (2017), 7 pages.

J. Sangster and C.W. Bale, The Na-SN (Sodium-Tin) System J. Phs Eqil and Diff 19, 76-81 (1998).†

† cited by third party

FIG. 1

Na-NaI battery:
Na → Na$^+$ + e$^-$  $E^0_-$ = 0V
I$_3^-$ + 2e$^-$ → 3I$^-$  $E^0_+$ = 3.24
2Na + I$_3^-$ → 2Na$^+$ + 3I$^-$  $E^0_{cell}$ = 3.24V

SODIUM ELECTROCHEMICAL INTERFACES WITH NASICON-TYPE CERAMICS

CROSS-REFERENCE TO RELATED APPLICATION

This application claims the benefit of U.S. Provisional Application No. 62/940,697, filed Nov. 26, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to sodium electrochemical technologies and, in particular, to coating or otherwise modifying the surfaces and interfaces of NaSICON-type ceramics to improve sodium electrochemical properties and performance.

BACKGROUND OF THE INVENTION

Numerous technologies rely on the electrochemistry of metallic sodium (Na), and many of these systems, by necessity, use a sodium ion-conducting solid-state electrolyte as a separator or membrane to enable the sodium electrochemistry. Such technologies include, but are not limited to, sodium-based batteries, material purification (Na removal from NaOH-rich radioactive waste), molten sodium upgrading (MSU) of oil feedstocks, chemical synthesis or production, alkali-metal thermal-to-electric converters (AMTEC), sometimes referred to as "Sodium Heat Engines (SHE)", and purification of sodium-contaminated materials. See J. H. Gordon, "Post Retort, Pre Hydro-treat Upgrading of Shale Oil," Final Report, DOE Award No. DE-FE0000408 (January, 2013); U.S. Pat. No. 6,235,183 to Putter; Y. Guo, "Mixed Ionic and Electronic Conducting Electrode Studies for an Alkali Metal Thermal to Electric Converter," Ph.D. Thesis Dissertation, Texas A&M University (December, 2006); M. S. Fountain et al., *Sep. Sci. Technol.* 43(9-10), 2321 (2008); and D. E. Kurath et al., *Sep. Sci. Technol.* 32(1-4), 557 (1997). In each of these technologies, the interface between sodium metal, which can be solid or molten, and the sodium ion-conducting ceramic is critical to efficient electrochemical function. Many of these technologies use an electrochemical interface between sodium and a class of ceramic materials known as NaSICONs (Sodium (Na) Super Ion CONductors).

An exemplary technology that uses a sodium-NaS ICON electrochemical interface is the molten sodium battery. Molten sodium batteries offer great promise as safe, cost-effective, reliable grid-scale energy storage system due to their high theoretical energy capacity and use of inexpensive and widely abundant materials. See S. Sorrell, *Renewable Sustainable Energy Rev.* 47, 74 (2015); H. Safaei and D. W. Keith, *Energy Environ. Sci.* 8, 3409 (2015); K. B. Hueso et al., *Energy Environ. Sci.* 6, 734 (2013); and L. J. Small et al., *J. Power Sources* 360, 569 (2017). Widespread adoption of molten sodium batteries, however, has been limited by the high operating temperatures (~300-350° C.) necessary, in part, to achieve facile charge transfer between the molten sodium anode and the solid electrolyte separator needed for desirable battery performance. See K. B. Hueso et al., *Energy Environ. Sci.* 6, 734 (2013); and K. B. Hueso et al., *Nano Res.* 10, 4082 (2017). The enabling of low temperature operation of molten sodium batteries would unlock the promise of these systems, as lowering the operating temperature increases battery longevity, reduces materials cost, and increases safety, making these systems substantially more attractive for widespread adoption. See L. J. Small et al., *J. Power Sources* 360, 569 (2017); and H.-J. Chang et al., *Adv. Mater. Interfaces* 5, 1701592 (2018).

Traditional high temperature molten sodium batteries, such as Na-S or Na-NiCl$_2$, rely on the use of β"-Al$_2$O$_3$ solid electrolyte as a separator. See K. B. Hueso et al., *Energy Environ. Sci.* 6, 734 (2013); and K. B. Hueso et al., *Nano Res.* 10, 4082 (2017). Sodium beta batteries, as they are often called, suffer dramatically from the poor wetting of molten sodium on β"-Al$_2$O$_3$, a problem that is greatly exacerbated as the temperature drops below 250° C. See K. B. Hueso et al., *Nano Res.* 10, 4082 (2017); K. Ahlbrecht et al., *Ionics* 23, 1319 (2017); M. Holzapfel et al., *Electrochim. Acta* 237, 12 (2017); X. Lu et al., *Nat. Commun.* 5, 4578 (2014); and D. Reed et al., *J. Power Sources* 227, 94 (2013). Wetting of molten sodium, as determined by the measurement of contact angle, is often discussed interchangeably with charge transfer. See K. Ahlbrecht et al., *Ionics* 23, 1319 (2017). Contact angle is often a reflection of the degree of physical contact between the molten sodium and the ceramic separator at their interface. A low contact angle of <90° implies intimate contact between the Na and the ceramic surface, while a high contact angle (>90°) implies poor contact at the Na-ceramic interface. Poor interfacial contact between the Na and the ceramic limits the surface area through with Na$^+$ ions can travel, which dramatically increases the interfacial resistance as cations such as Na$^+$ can only travel through localized "choke points" through the ceramic. See W. Zhou et al., *ACS Cent. Sci.* 3, 52 (2017); K. Fu et al., *Sci. Adv.* 3, e1601659 (2017); M. J. Wang et al., *Joule* 3, 2165 (2019); and S. Wei et al., *Acc. Chem. Res.* 51, 80 (2018).

One method to improve wetting on β"-Al$_2$O$_3$ has been the extensive application of coatings, such as Ni nanowires, porous carbons, porous iron oxide, Pb particles, Bi islands, and a screen-printed Pt grid. See X. Lu et al., *Nat. Commun.* 5, 4578 (2014); Y. Hu et al., *J. Power Sources* 240, 786 (2013); Y. Hu et al., *J. Power Sources* 219, 1 (2012); Y. Hu et al., *Solid State Ionics* 262, 133 (2014); H.-J. Chang et al., *J. Mater. Chem. A* 6, 19703 (2018); and D. Jin et al., *ACS Appl. Mater. Interfaces* 11, 2917 (2019). A second method that has been tested on β"-Al$_2$O$_3$, is alloying the Na anode with low melting temperature alkali metals or with other relatively low melting temperature metals, such as Bi or Sn, to improve wetting. See K. Ahlbrecht et al., *Ionics* 23, 1319 (2017); X. Lu et al., *Nat. Commun.* 5, 4578 (2014); D. Reed et al., *J. Power Sources* 227, 94 (2013); Y. Hu et al., *J. Power Sources* 240, 786 (2013); Y. Hu et al., *J. Power Sources* 219, 1 (2012); D. Jin et al., *ACS Appl. Mater. Interfaces* 11, 2917 (2019); H. Liu et al., *ACS Mater. Lett.* 1, 217 (2019); and C. Wang et al., *Adv. Energy Mater.* 8, 1701963 (2018). However, there has been limited work undertaken to determine Na wetting below 150° C. Results from literature demonstrate that the wetting of Na, as determined by the contact angle of Na on the ceramic, proves to be very poor at temperatures below 150° C. The exception appears to be alloying Na with other low-melting temperature alkali metals (K, Rb, Cs). See X. Lu et al., *Nat. Commun.* 5, 4578 (2014). Safety and stability are a concern with these alloys, however. K and Rb are capable of ion exchange with the Na$^+$ in β"-Al$_2$O$_3$, and the resulting volume expansion can cause the ceramic to fracture. Concerns about the safety of using the large mass of Cs necessary for grid-scale storage are noteworthy, in addition to its expense, due to its violent reactivity with water and formation of an explosive superoxide. For the time being, alloying Na with alkali metals to improve the wetting at low temperatures appears to be impractical for large scale applications.

As described above, prior work on molten Na wetting has focused on the use of β"-Al$_2$O$_3$. In the case of low temperature (T<200° C.) molten sodium batteries, however, NaSICON displays higher ionic conductivities compared to β"-Al$_2$O$_3$ at low temperature. See L. J. Small et al., *J. Power Sources* 360, 569 (2017); D. Reed et al., *J. Power Sources* 227, 94 (2013); and S. Song et al., *Sci. Rep.* 6, 32330 (2016). To date there have been few studies on the improvement of the interface between molten sodium and NaSICON at low temperature. One study used a deposited layer of indium tin oxide and another deposited graphene like carbon. See L. Xue et al., *Adv. Energy Mater.* 5, 1500271 (2015); and E. Matios et al., *ACS Appl. Mater. Interfaces* 11, 5064 (2019). In β"-Al$_2$O$_3$, the poor wetting of Na is often attributed to the high surface tension of molten Na, combined with the formation of Na$_2$O when molten Na reacts with adsorbed water on the surface of β"-Al$_2$O$_3$ or by the presence of surface Ca impurities leftover from synthesis. See X. Lu et al., *Nat. Commun.* 5, 4578 (2014); D. Reed et al., *J. Power Sources* 227, 94 (2013); D. Jin et al., *ACS Appl. Mater. Interfaces* 11, 2917 (2019); L. Viswanathan and A. V. Virkar, *J. Mater. Sci.* 17, 753 (1982); and M. W. Breiter et al., *Solid State Ionics* 14, 225 (1984). It is not obvious, however, if these mechanisms for poor wetting and methods to improve molten Na wetting are applicable to NaSICON, which is synthesized in a very different manner and demonstrates substantially lower water reactivity than β"-Al$_2$O$_3$.

SUMMARY OF THE INVENTION

The present invention is directed to method for improving a sodium electrochemical interface, comprising providing a sodium-ion conducting NaSICON-type ceramic having a surface, and forming a sodium ion-conducting intermetallic phase on the surface of the NaSICON-type ceramic, thereby providing a sodium electrochemical interface with improved sodium ion conduction from a sodium source through the NaSICON-type ceramic. Forming the interface can comprise coating the surface of the NaSICON-type ceramic with a metal, metalloid, or alloy thereof, and forming the intermetallic phase with sodium at a temperature below the melting temperature of the metal, metalloid, or alloy. For example, the metal can comprise a group 14 or 15 post-transition metal, such as tin, bismuth, or lead. For example, the metalloid can comprise silicon, germanium, or antimony. Forming the interface can comprise coating the surface of the NaSICON-type ceramic with an oxide or chalcogenide of a metal, metalloid, or alloy thereof, and forming the intermetallic phase with sodium at a temperature below the melting temperature of the oxide or chalcogenide. For example, the oxide can comprise Sb$_2$O$_3$, GeO$_2$, or SnO$_2$. Forming the interface can comprise modifying the material structure of the surface or bulk of the NaSICON-type ceramic, such as doping the surface or bulk of the NaSICON-type ceramic with a metal such as tin. The interface can operate at a low (less than 200° C.) or high (greater than 200° C.) temperature, depending on the properties of the intermetallic phase.

To reduce the costs and increase the lifetimes of molten sodium batteries there is a desire to reduce the operating temperature to near or even below the melting temperature of sodium (98° C.), which makes the selection of NaSICON and chemical variants of the traditional NaSICON ceramic attractive as a separator. As an example of the invention, enhanced mating of the separator-sodium interface by means of engineered coatings or surface modification can result in lower interfacial resistance and higher battery performance at increased current densities, enabling the effective operation of molten sodium batteries and other electrochemical technologies. Tin (Sn) was chosen as an exemplary coating due to its favorably low solubility in Na at low temperatures and high Na$^+$ conductivity based on previous Na$^+$-ion anode work. It was determined that Sn dynamically forms a NaSn intermetallic that acts as a Na$^+$ ion-conducting layer on the surface of the NaSICON, decreasing interfacial resistance by more than an order of magnitude, and drastically decreasing the voltage required to drive a symmetric Na-NaSICON-Na cell at 50 mA cm$^{-2}$. Therefore, intermetallic-forming coatings can lower the interfacial resistance between molten Na and NaSICON at low temperatures for molten sodium batteries, as well as other electrochemical applications.

BRIEF DESCRIPTION OF THE DRAWINGS

The detailed description will refer to the following drawings, wherein like elements are referred to by like numbers.

FIG. 4(b) is an image of the Na drop on bare NaSICON after the measurement. FIG. 4(c) shows a contact angle measurement of molten Na on NaSICON with Sn coating below critical thickness. FIG. 4(d) is an image of the Na drop on NaSICON with Sn coating below critical thickness after the measurement. FIG. 4(e) shows a contact angle measurement of molten Na on NaSICON with Sn coating above critical thickness. FIG. 4(f) is an image of the Na drop on NaSICON with Sn coating above critical thickness after the measurement.

DETAILED DESCRIPTION OF THE INVENTION

The present invention is directed to coating or otherwise modifying the surfaces and interfaces of NaSICON-type ceramics to improve sodium electrochemical properties and performance. NaSICON-type ceramics represent a broad family of materials that can be generally described with basic formula $A_{1+x+y}M'_xM_{2-x}B_yB'_{3-y}O_{12}$ (0≤x≤2, and 0≤y≤3), which forms a three-dimensional hexagonal framework of corner-sharing oxide tetrahedra and octahedra. See Q. Ma and F. Tietz, ChemElectroChem 7, 2693 (2020); and B. E. Scheetz et al., Waste Manage. 14(6), 489 (1994). In many cases, the A represents a sodium (Na) ion or other substituting alkali ion occupying interstitial sites, while M and M' comprise multivalent transition metal cations (M is commonly tetravalent, while M' can be trivalent, tetravalent, or pentavalent) that occupy octahedral sites. B and B' form the tetrahedra and B is typically silicon and B' is typically phosphorus. The NaSICON structure can accommodate significant substitutions on A, M, and B sites, including a large fraction of the periodic table, making it a widely versatile and tailorable material. To date, the most highly conductive compositions of NaSICON-type ceramics typically involve silica and phosphate tetrahedra, zirconia octahedra, and sodium at the A site. Although the examples below describe traditional NaSICON compositions (e.g., $Na_{1+y}Zr_2Si_yP_{3-y}O_{12}$, 0≤y≤3), the invention is generally applicable to all NaSICON-type ceramics.

The present invention is directed to sodium intermetallic-forming interfaces to provide improved mating of sodium-NaSICON surfaces with reduced interfacial resistance and more efficient charge transfer properties or sodium (or sodium alloy) adhesion to the NaSICON-type ceramic. The intermetallic interface can be formed by first coating the surface with a material that forms a sodium ion-conducting intermetallic phase with sodium. The starting coating material needs to be insoluble or sparingly soluble (<<1 wt %) in sodium at the temperature at which the intermetallic is formed. In general, the coating can comprise a metal or metalloid, or an alloy, oxide, or chalcogenide thereof, that is capable of reacting with sodium to form the intermetallic interface. For example, the metal can comprise a group 14 or 15 post-transition metal, such as tin, bismuth, or lead, which are known to form sodium ion-conducting intermetallic compounds. For example, the metalloid can be silicon, germanium, or antimony. For example, exemplary oxides include $Sb_2O_3$, $GeO_2$, and $SnO_2$. The coating can be deposited by sol-gel chemistry evaporation, pulsed-laser deposition, chemical vapor deposition, atomic layer deposition, sputtering, or other methods common to the field. Alternatively, the NaSICON interface can be formed through direct modification or doping the NaSICON material structure. For example, a metal-substituted NaSICON (e.g., Sn substitution), either in bulk or at the NaSICON surface, can be used as a sacrificial reactive layer to improve the sodium interface. In any case, the resulting intermetallic must be a sodium ion conductor. Further, the resulting intermetallic needs to have a melting temperature higher than the operating temperature at which the NaSICON-type ceramic is used. Therefore, to form the intermetallic interface, the coating or interfacial layer can be applied to the NaSICON surface at a temperature below the melting temperature of the coating material, forming an intermetallic interface that melts or degrades at a higher temperature. For example, as will be described below, a NaSn "chaperone" phase can be formed at a low temperature to avoid melting of the Sn coating. However, the resulting intermetallic NaSn phase is stable to much higher temperatures and can facilitate improved performance of the sodium electrochemical interface at temperatures well above 200° C. Therefore, the intermetallic interface can be operated either at the low temperature at which it forms or at a higher temperature, but below the temperature at which the intermetallic phase melts of otherwise degrades. The coatings can improve the physical, chemical, and electrochemical interfaces between sodium and a NaSICON electrolyte at reduced temperatures (e.g., below 200° C.), or in higher temperature operations. Therefore, in addition to enabling low temperature molten sodium batteries, there are several other applications for which the invention may be beneficial, as will be described below.

Example: Low Temperature Molten Sodium Battery

Figure 1:
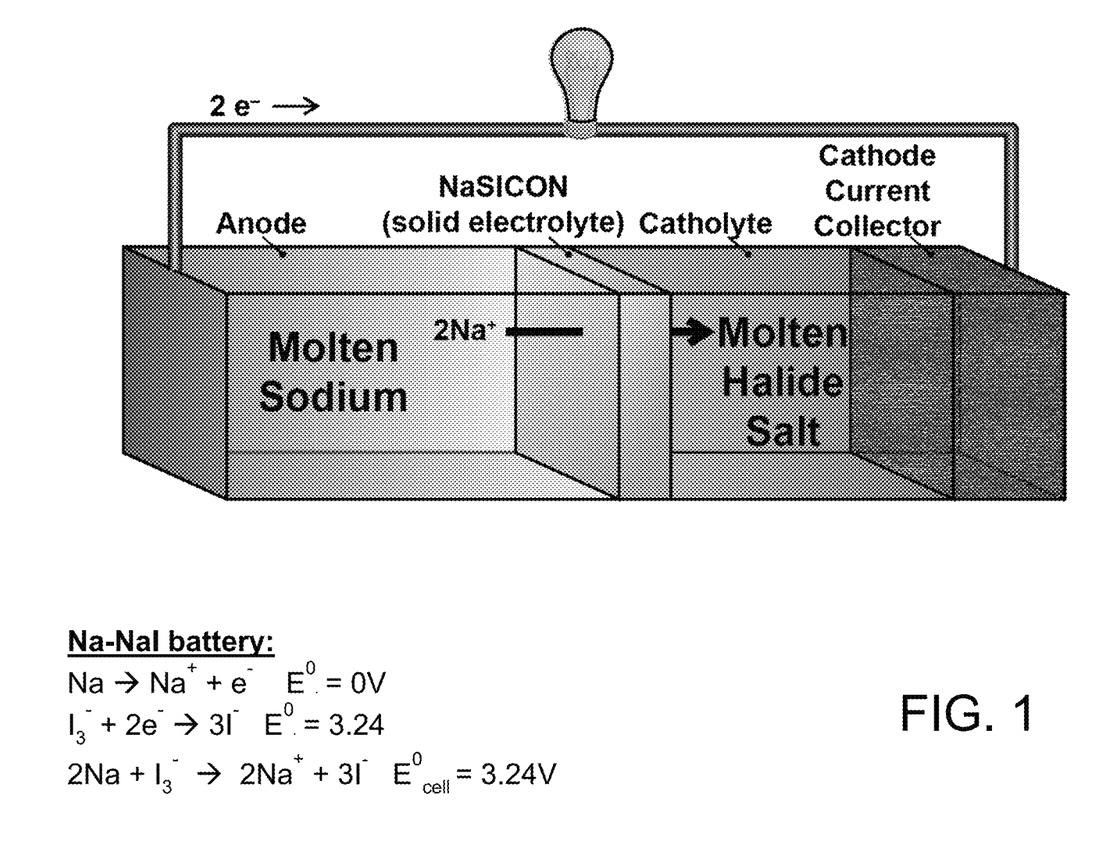
FIG. 1 is a schematic illustration of a low temperature molten sodium (Na-NaI) battery.

Although the invention can be applied to any technology that uses a sodium electrochemical interface with a NaSICON-type ceramic, an exemplary application of the invention is a sodium-NaSICON interface in a low temperature molten sodium battery. A schematic illustration of a low temperature molten sodium battery is shown in FIG. 1. This exemplary molten sodium battery comprises a sodium-based liquid metal anode, a NaSICON ion-conducting separator, an inorganic molten halide salt catholyte, and anode and cathode current collectors. The sodium-based liquid metal anode can comprise pure molten sodium (as shown) or an alloy of sodium and other alkali metal(s), such as lithium, potassium, rubidium, or cesium. Liquid sodium metal is a preferable anode material, due to its high energy density, electrochemical reversibility, high electrical conductivity ($10^5$ S/cm), low melting point (98° C.), earth abundance, and relative safety. See S. Ha et al., ChemPhysChem 15, 1971 (2014); K. Hueso et al., Energy Environ. Sci. 6, 734 (2013); W.-L. Pang et al., J. Power Sources 356, 80 (2017); and F. Wan et al., Nano Energy 13, 450 (2015). The separator electrically isolates the two electrolytes (anode and cathode) and allows conduction of cations to maintain charge balance across the two electrolytes. Preferably, a zero-crossover separator selectively favors transport of the desired charge carrier, Na⁺, and prevents transport of redox-active molecules and solvents that can contribute to capacity loss. In particular, it has been found that some NaSICON ceramics retain significant conductivity at low temperatures <200° C. and provide a mechanically robust ceramic separator that is chemically and electrochemically compatible with liquid sodium and halide salts. See A. Jolley et al., Ionics 21, 3031 (2015); A. Jolley et al., J. Amer. Ceram. Soc. 98, 2902 (2015); X. Lu et al., J. Power Sources 195, 2431 (2010); X. Lu et al., J. Power Sources 215, 288 (2012); and J. Kim et al., J. Electroanal. Chem. 759, 201 (2015). For example, $Na_3Zr_2Si_2PO_{12}$ has a Na-ion conductivity of >$10^{-4}$ S/cm and variants can exceed $10^{-3}$ S/cm at 25° C. In addition to molten halide salts, the catholyte can comprise a variety of materials, including organic solvents, aqueous electrolytes, ionic liquids, sulfur/polysulfides, or molten salts. The cathode current collector preferably has a high surface area and is chemically and electrochemically inert, enabling fast charge transfer. For example, the cathode current collector can comprise tungsten rods or an activated carbon felt. The current collector oxidizes or reduces the catholyte during charging and discharging (i.e., extracts electrons from the catholyte during charging and injects electrons into the catholyte during discharging).

An exemplary liquid catholyte comprises NaI complexed in $AlBr_3$, which has a low melting temperature (e.g., <100° C.). See U.S. Appl. Ser. No. 16/564,751, filed Sep. 9, 2019, which is incorporated herein by reference. This catholyte can make use of the reversible iodide/triiodide redox couple to store and release charge and which has been shown to have a high energy density. See Y. Zhao et al., *Nat. Commun.* 4, 1896 (2013). The redox chemistry for the Na-NaI battery in shown in FIG. 1. Importantly, however, when the operating temperature of the battery is reduced to near 100° C., sodium wetting of the NaSICON ceramic separator becomes very poor, resulting in high interfacial resistance and poor battery performance, particularly at current densities relevant to large format battery function. In particular, improper wetting leads to current constriction through small active areas of the separator, eventually forming shorts.

As an example of the invention, Sn coatings of various thicknesses on NaSICON were investigated for the purposes of enhancing interfacial contact and charge transfer between molten sodium and the solid electrolyte at low temperature. A dramatic lowering of overpotential in molten sodium symmetric cells with a NaSICON separator by the application of these Sn coatings was demonstrated. It was found that in-situ formation of a tin-based NaSn chaperone phase on the NaSICON ion conductor surface greatly improved charge transfer and lowered interfacial resistance in sodium symmetric cells operated at 110° C. and current densities up to 50 mA $cm^{-2}$. It was further shown that static wetting testing, as measured by the contact angle of molten sodium on NaSICON, does not accurately predict battery performance due to the dynamic formation of the $Na^+$ ion conducting NaSn chaperone phase during cycling.

NaSICON Disk Preparation

Figure 2:
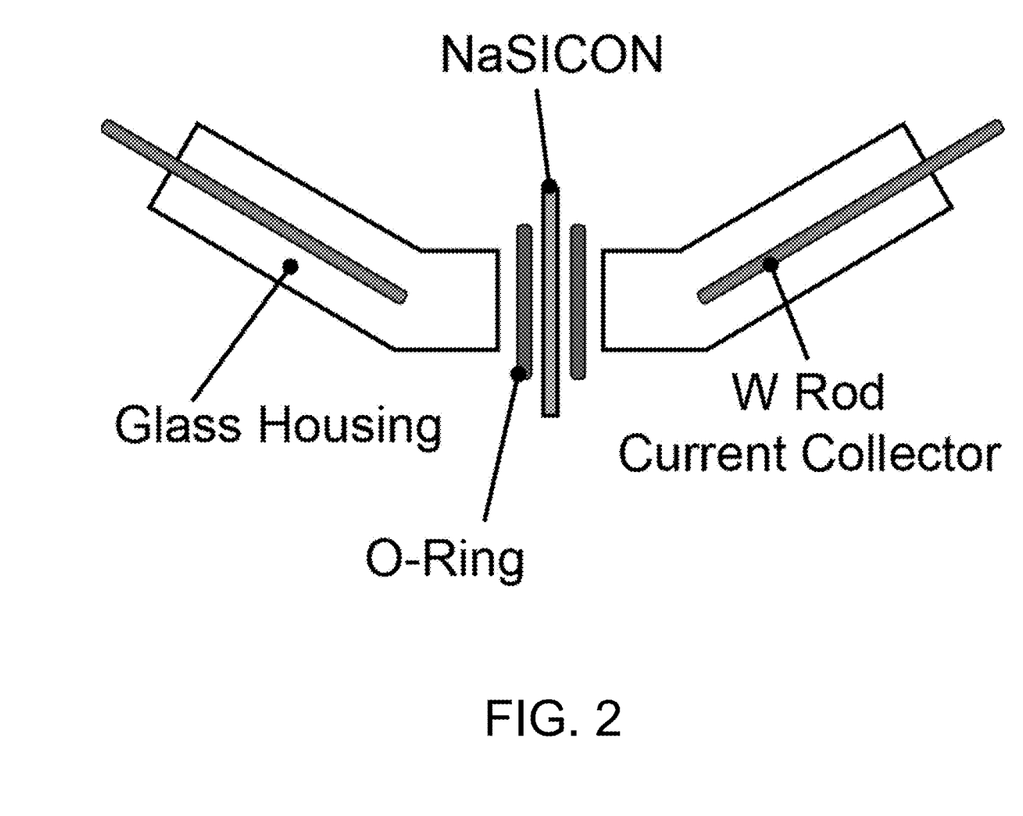
FIG. 2 is a schematic illustration of a symmetric cell for electrochemical testing of NaSICON separators.
Figure 3A:
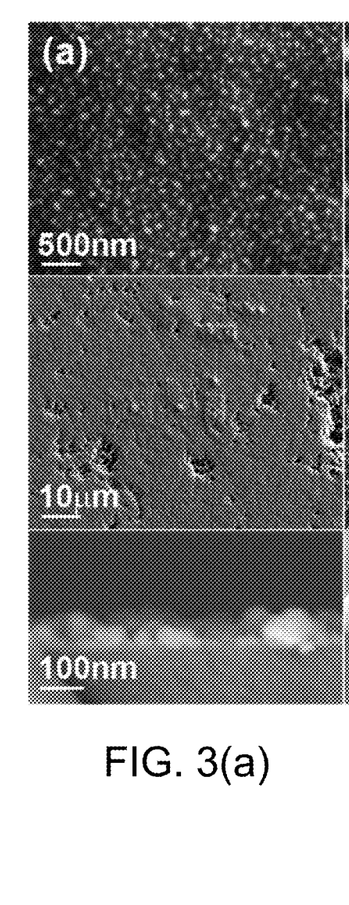
FIGS. 3(a)-(d) show SEM images of FIG. 3(a) 40 nm, FIG. 3(b) 170 nm, FIG. 3(c) 500 nm, and FIG. 3(d) 700 nm thick Sn coating on NaSICON.
Figure 3B:
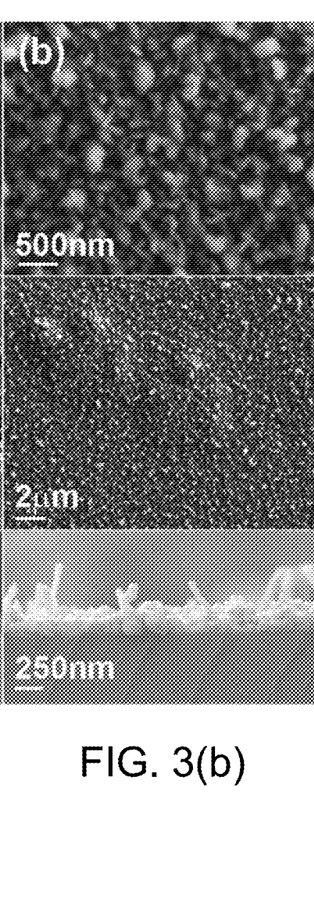
Figure 3C:
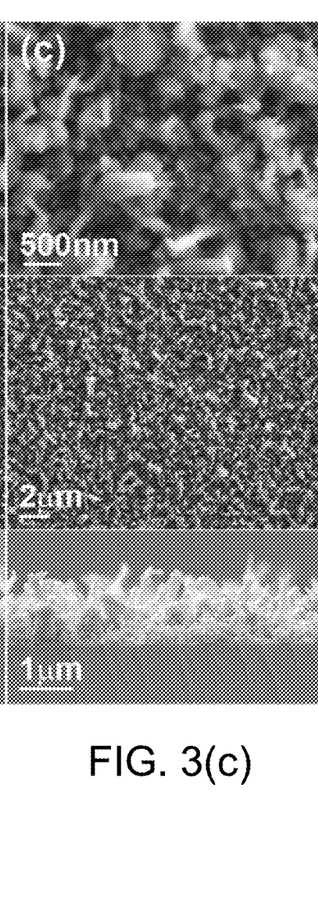
Figure 3D:
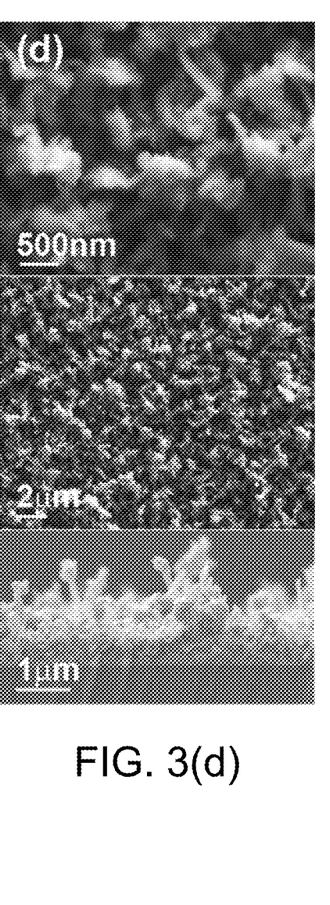

A NaSICON ($Na_3Zr_2Si_2PO_{12}$) precursor powder was synthesized by combining zirconium (IV) silicate ($ZrSiO_4$, ~325 mesh) and sodium phosphate tribasic dodecahydrate ($Na_3PO_4 19$ 12 $H_2O$) in, respectively, a 2:1 molar ratio. The mixture was ball-milled for 12 h with ~⅓ of the final volume of zirconia milling media and ⅓ of the final volume of ethanol. The resulting mixture was cleaned from the milling media with ethanol, dried with a rotary evaporator to remove the bulk ethanol, and further dried under vacuum overnight. The NaSICON precursor powder was calcined at 600° C. for 2 hours in air. Once cooled to 100° C. the calcined powder was immediately moved to a dry nitrogen purge box, ground with a mortar and pestle, sifted, and poured into 1.125-inch die for pressing to 10 kpsi. The pressed cylinder was buried in NaSICON precursor powder containing a 5% excess of $Na_3PO_4$, within a β-$Al_2O_3$ crucible and covered before sintering in air at 1230° C. for 12 h with a 5° C. $min^{-1}$ ramp and cooling rate. After sintering, the cylinder was sliced into approximately 1 mm thick disks using a low speed diamond blade saw. NaSICON disks used for sessile drop testing were polished on one surface to P2500 grit. NaSICON disks used for symmetric electrochemical cell testing were polished to 0.8-0.9 mm thickness at P2500 grit on both sides. Polished NaSICON disks for wetting tests were coated with Sn on one side, while NaSICON disks for symmetric cells were coated on both sides to the specified thickness. Cells were assembled in a planar configuration using custom glass cell parts, as shown in FIG. 2. A piece of NaSICON, with or without Sn coating, was placed between two Na-filled chambers and the cell was sealed with EPDM O-rings in an argon atmosphere. The geometric area of the NaSICON was 1.76 $cm^2$.

Wettability of Bare and Tin-Coated NaSICON

In order to better understand the phase evolution of the Na-Sn-NaSICON interphase and its influence on interfacial resistance and practical battery performance, a series of NaSICON samples were prepared with Sn coatings systematically varied in thickness from 0 to 700 nm. The Sn coatings were deposited by radio frequency (RF) magnetron sputtering and pure Sn phase was confirmed by x-ray diffraction (XRD) and energy-dispersive x-ray spectroscopy (EDX). Coating thickness was measured by profilometry and scanning electron microscopy (SEM) of the cross-section of Sn coatings on glass slides. The thicknesses of the dense portion of the coating (neglecting rough surface features) were nominally 40 nm, 170 nm, 500 nm, and 700 nm. FIGS. 3(*a*)-(*d*) show representative images of the Sn coatings at each thickness. Each of the Sn coatings, as deposited, exhibit substantial roughness in their surface morphology, with surface roughness increasing with increasing coating thickness. SEM of the coating cross-section shows that the 40 nm coatings were non-conformal, with some bare patches of substrate on the order of a few nanometers. All other coatings cover the substrate surface completely, as verified by EDX maps confirming the Sn coating on a NaSICON substrate.

As discussed above, there have been limited studies to date on the wetting of molten sodium on NaSICON solid electrolytes, and no studies have been performed previously at low temperatures (<150° C.). Previous work to improve molten Na wetting on β"-$Al_2O_3$ has described the importance of the "critical thickness" of a coating, in relation to coatings made of metals that are partially soluble in molten sodium. See D. Reed et al., *J. Power Sources* 227, 94 (2013); and D. Jin et al., *ACS Appl. Mater. Interfaces* 11, 2917 (2019). Critical thickness is the thickness above which the metal coating exceeds its solubility limit in the molten sodium, at which point a layer of the metal coating remains after contact with the molten sodium. Previous work has either used metal coatings below the critical thickness or developed island- or grid-type coating structures so as to prevent depositing a metal blocking layer on the ceramic surface. See K. Ahlbrecht et al., *Ionics* 23, 1319 (2017); X. Lu et al., *Nat. Commun.* 5, 4578 (2014); D. Reed et al., *J. Power Sources* 227, 94 (2013); H.-J. Chang et al., *J. Mater. Chem. A* 6, 19703 (2018); and D. Jin et al., *ACS Appl. Mater. Interfaces* 11, 2917 (2019).

Sn is sparing soluble in Na. The solubility limit of Sn at 110° C. was calculated to be $6.7 \times 10^{-3}$ wt % Sn using the FactSage 7.4 FTlite database. See E. Matios et al., *ACS Appl. Mater. Interfaces* 11, 5064 (2019); and FactSage 7.4 FTlite Database, http://www.crct.polymtl.ca/fact/documentation/, (accessed October 2019). For contact angle measurements taken by sessile drop technique, the critical thickness was estimated to be 100 nm. For symmetric cells, discussed later, the critical thickness was estimated to be 220 nm, due to the larger mass of sodium (4 g) and increased contact area (1.76 cm$^2$). Accordingly, the coating thicknesses of 40 nm to 700 nm were both above and below the critical thickness, as determined by the solubility of Sn.

Figure 4A:
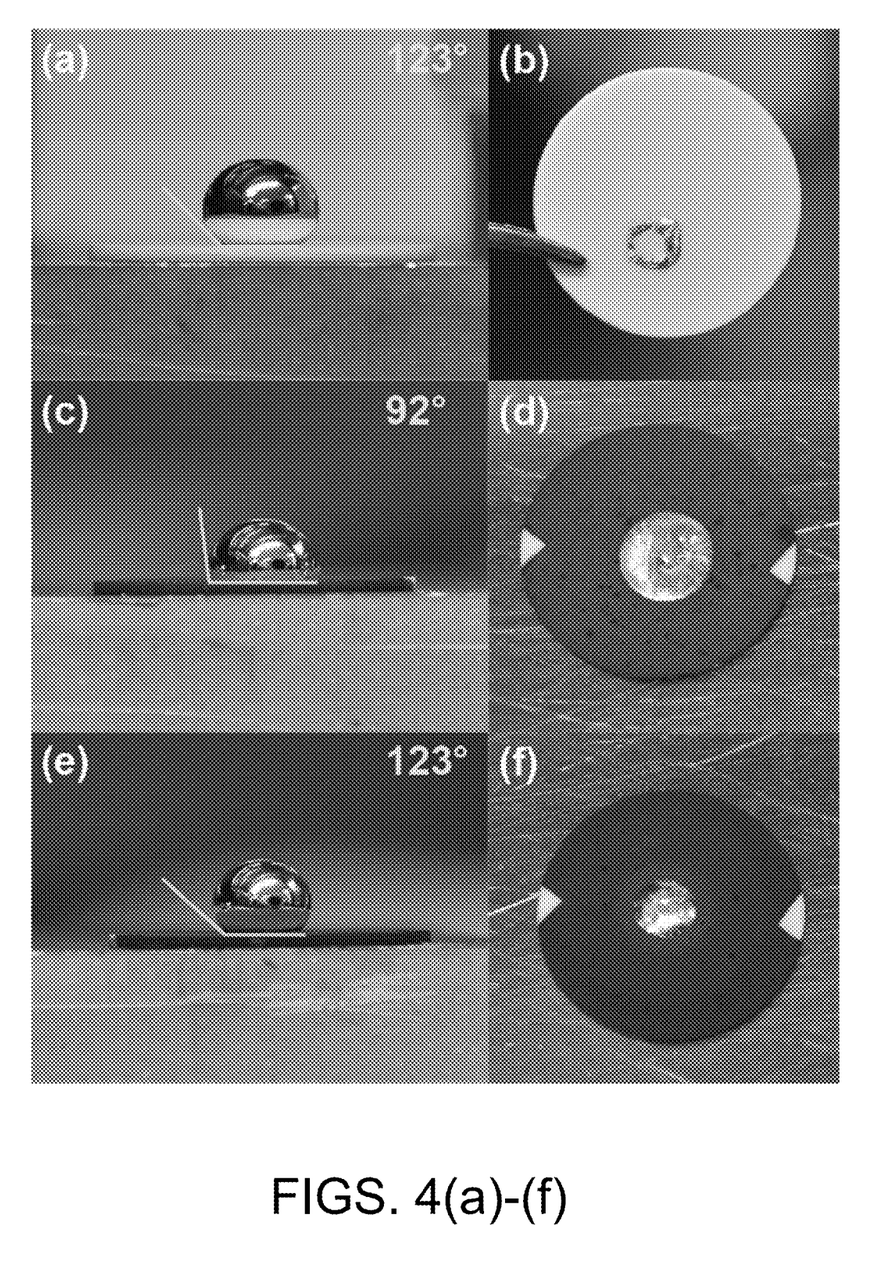
FIG. 4(a) shows a contact angle measurement of molten Na on bare NASICON.

Wettability testing was performed, as contact angle measurement is typically used as a method of screening different materials and approaches to improve wetting of molten sodium to a solid electrolyte. Wettability of the molten Na on the NaSICON was determined by the sessile drop technique, in which the contact angle of a molten Na drop was measured on bare NaSICON and on Sn-coated NaSICON, in which the Sn coating thicknesses were below and above the critical thickness. A contact angle of <90° is considered to demonstrate wetting of the liquid to the solid surface, while a contact angle of >90° is considered to be nonwetting. As shown in FIG. 4(a), molten sodium wet poorly to bare NaSICON at 110° C. and achieved a best contact angle of 123°. As shown in FIG. 4(c), molten Na achieved a best contact angle of 92° to NaSICON coated with Sn below the critical thickness. As shown in FIG. 4(e), when coated with Sn above the critical thickness, molten Na achieved a contact angle similar to that on bare NaSICON. This angle is also like that achieved with a molten Na—Sn alloy on bare NaSICON. Interestingly, Sn coatings exhibited a slight color change after deposition of the Na drop, seen most clearly in FIG. 4(f) as a ring of blue around the Na. Literature indicates a possible sodiation of the Sn, but XRD was unable to reveal any new phase formation, as is further illustrated in FIG. 7. See J. S. Gutiérrez-Kolar et al., ACS Appl. Energy Mater. 2, 3578 (2018). Removal of the Na drop further demonstrates the poor wetting of the Na on bare NaSICON, shown in FIG. 4(b), as most of the Na was easily removed. Na was difficult to remove from both Sn-coated NaSICON coupons, regardless of Sn thickness, as shown in FIGS. 4(d) and 4(f), indicating better adherence of Na to the NaSICON surface with a Sn coating. In sum, Sn coatings below the critical thickness enhanced Na wetting on NaSICON, while Sn coatings above the critical thickness did not change the contact angle as compared to bare NaSICON.

Performance of NaSICON Electrochemical Cells

It is typically reasoned that improvement in the contact angle should correlate to decreased interfacial resistance and overall battery performance. The primary goal of this invention, however, is not explicitly improved contact angle but instead improved charge transfer and lower interfacial resistance in a molten sodium battery. With this in mind, symmetric cells, as shown in FIG. 2, were assembled using bare NaSICON and Sn-coated NaSICON to verify that the improved wettability observed in the contact angle testing correlated to lowered interfacial resistance and improved battery performance. Symmetric cells were tested with Sn coatings at thicknesses above (500 nm, 700 nm) and below (40 nm, 170 nm) the estimated critical thickness of 220 nm at 110° C.

Figure 5A:
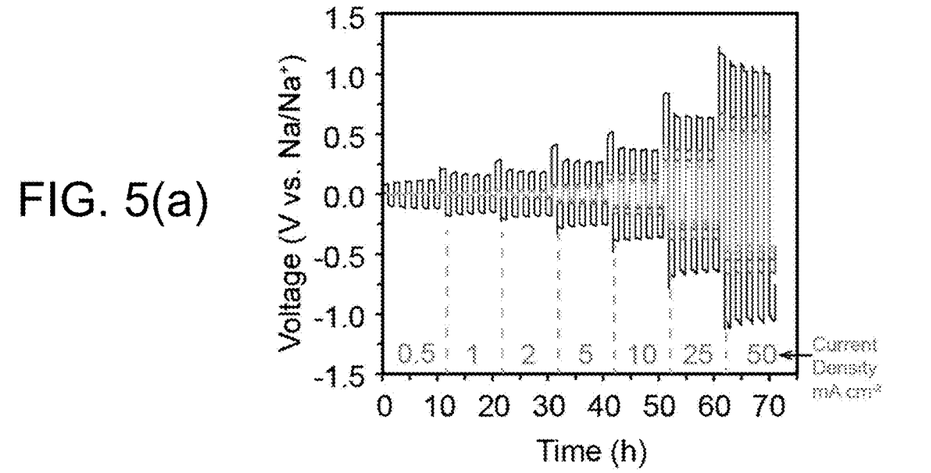
FIG. 5(a) is a graph showing measured voltages of an electrochemically cycled symmetric sodium cell assembled with bare and Sn-coated NaSICON at 110° C.
Figure 5B:
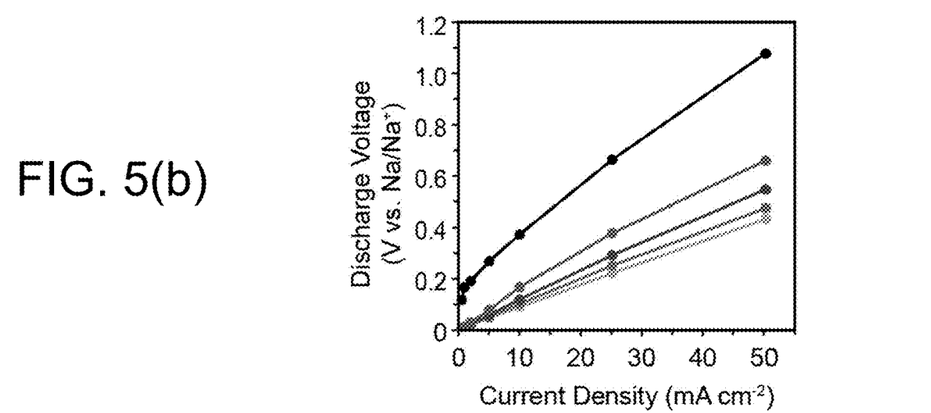
FIG. 5(b) is a graph of average discharge voltage at different current densities.
Figure 5C:
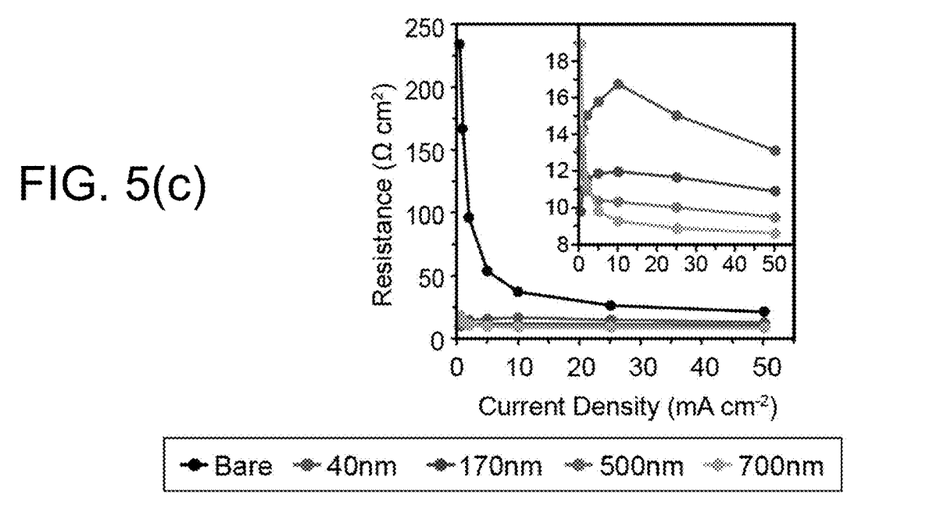
FIG. 5(c) is a graph of resistances obtained by DC measurement.

The symmetric cells were cycled at different current densities to determine the effect of Sn-coated NaSICON on battery performance. Cells were cycled for 5 cycles at each current density, starting at 0.5 mA cm$^{-2}$ and increasing up to 50 mA cm$^{-2}$. As can be seen in FIG. 5(a), the application of a Sn coating on NaSICON substantially lowers the overpotential of a symmetric cell compared to a cell assembled with bare NaSICON. Moreover, the presence of Sn stabilizes the cycling behaviour. Whereas bare NaSICON displayed a charging voltage higher on the first cycle than subsequent cycles, Sn-coated NaSICON displayed a consistent charge-discharge profile. Analysis of the NaSICON after cycling shows that Sn-coated NaSICON demonstrates excellent wetting to the Na compared to bare NaSICON, regardless of Sn coating thickness. Contrary to what was expected from the static contact angle testing, overpotential decreases with increasing Sn coating thickness; cells with coatings above the critical thickness (500 nm, 700 nm) show better performance compared to cells with coatings below the critical thickness (40 nm, 170 nm), as shown in FIG. 5(b). From the contact angle testing alone, it would have been expected that very thick layers of Sn would have demonstrated large overpotentials due to poor wetting of the Na. Furthermore, a thick layer of Sn present at the interface would have been expected to act as a blocking layer, preventing the transport of Na$^+$ ions as has been demonstrated previously with conformal Bi coatings. See D. Jin et al., ACS Appl. Mater. Interfaces 11, 2917 (2019). Instead, these results show that cells with thick Sn coatings above the critical thickness perform better than those with Sn coatings below the critical thickness, as shown in FIG. 5(c).

Figure 6A:
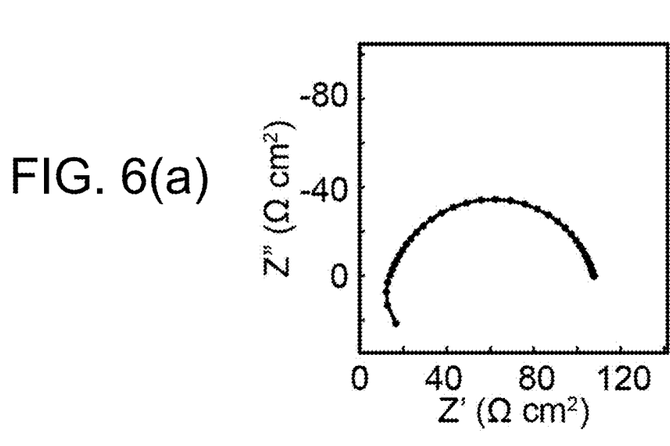
FIG. 6(a) is a graph of impedance of a symmetric cell assembled with bare NaSICON before cycling.

As one measure of charge transfer, impedance spectroscopy was performed on all symmetric cells before and after cycling. Characteristic Nyquist plots are shown in FIGS. 6(a)-(d). Generally, impedance spectra were offset along the Z' axis and display one or two semicircles in the complex impedance plane. This offset, related to the series resistance of the cell, is dominated by the NaSICON separator, but also includes the tungsten current collector, Na metal, and any bulk Sn-like coating on the NaSICON. The widths of the semicircles are attributed to charge transfer resistances across the Na-NaSICON interface. Thus, small semicircles with a small offset (i.e. closer to 0,0) are indicative of low resistances and superior cell performance. Before cycling, a marked difference is seen between cells with or without a Sn coating. As shown in FIG. 6(a), for cells assembled with bare NaSICON (no Sn coating), one large semicircle 53 Ω in diameter is seen, displaced 7.9 Ω along the Z' axis. The large semicircle diameter is attributed to a large interfacial charge transfer resistance between the Na and the NaSICON. The Z' axis offset is over double the resistance expected for NaSICON, implying poor surface contact between the molten Na and the NaSICON, as would be expected based on the contact angle measurements.

Figure 6B:
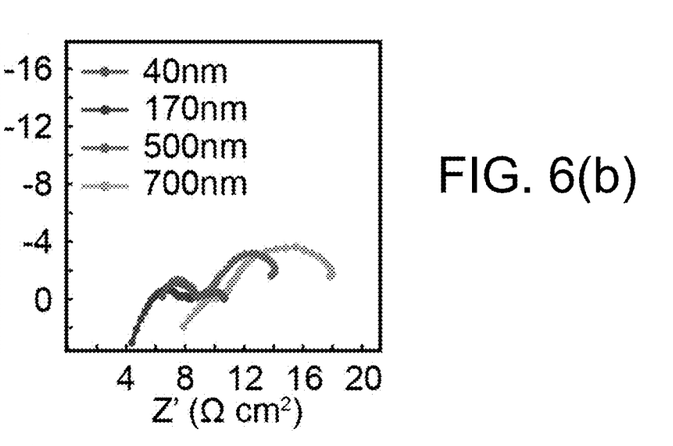
FIG. 6(b) is a graph of impedance of a symmetric cell assembled with Sn-coated NaSICON before cycling.

As shown in FIG. 6(b), the addition of a Sn coating to the NaSICON separator in an uncycled cell not only decreases the semicircle diameter by an order of magnitude, but also lowers the Z'-axis offset by more than a factor of two. That is to say, the Sn coating decreases both the interfacial charge transfer resistance as well as the series resistance of the cell. This series resistance of ~3.4Ω is on par with that expected for NaSICON bulk and grain boundary resistances, implying improved surface contact with the NaSICON. While this performance is expected for Sn coatings below the critical thickness from contact angle testing, a similar trend for Sn coatings above the critical thickness is seen as well. This trend implies that despite poor contact angles, molten sodium still achieves a good surface contact on the Sn-coated NaSICON. It is important to note that upon adding a Sn coating, another semicircle appears in the Nyquist plot. This additional semicircle is attributed to the replacement of the Na-NaSICON interface with the Na-Sn and Sn-NaSICON interfaces. Overall, these two interfacial resistances sum to much less than that of the Na-NaS ICON interfacial resistance seen in the case of bare NaSICON (~3 versus ~53 Ω). Thus, the Sn coating decreases the resistance of the system by both improving contact area by over a factor of two and decreasing the charge transfer resistance of the Na-NaSICON interface by greater than a factor of ten.

Figure 6C:
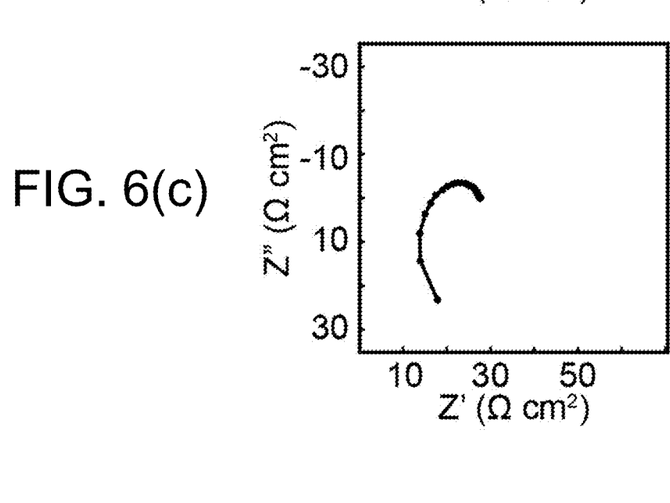
FIG. 6(c) is a graph of impedance of a symmetric cell assembled with bare NaSICON after cycling.
Figure 6D:
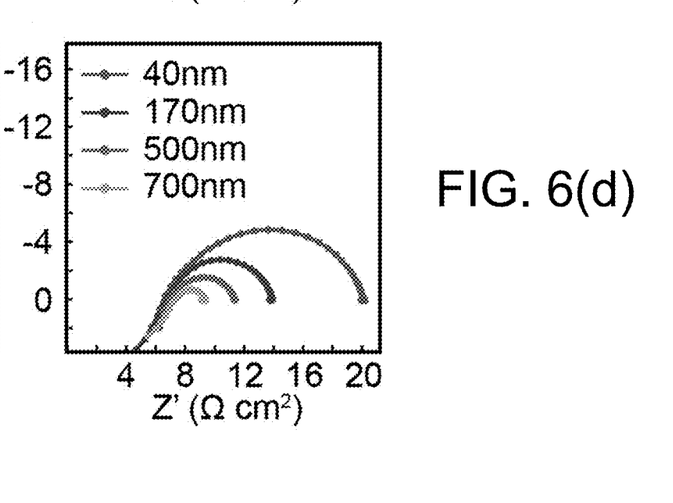
FIG. 6(d) is a graph of impedance of a symmetric cell assembled with Sn-coated NaSICON after cycling.

As shown in FIG. 6(c), after cycling the cells assembled with bare NaSICON demonstrate a larger series resistance, shown by a shift in the impedance spectra to a more positive position along the Z' axis. This indicates no improvement to the contact area between the Na and the NaSICON during battery cycling. A decrease in the semicircle diameter occurred, indicating improved charge transfer. As shown in FIG. 6(d), cells assembled with Sn-coated NaSICON see the two semicircles present before cycling (FIG. 6(b)) change to a single semicircle after cycling, regardless of Sn coating thickness. This change suggests an evolution of the structure at the Na-NaSICON interface. As the Sn thickness increases from 40 nm to 700 nm, a clear trend is observed: the width of the semicircle decreases, while simultaneously shifting more positive along the Z' axis. This is interpreted to mean that the charge transfer resistance across the Na-NaSICON interface decreases, while the series resistance of the cell modestly increases. Thus, increasing the starting Sn thickness effectively decreases the interfacial resistance of the Na-NaSICON interface after cycling. At the same time, increasing the Sn thickness modestly increases the series resistance of the cell by adding another highly conductive phase that the ions must pass through during cycling. This can be envisioned as a low resistance ionic chaperone phase, which facilitates the $Na^+$ ion transfer between the NaSICON and the Na metal.

Intermetallic NaSn "Chaperone" Phase

Figure 7:
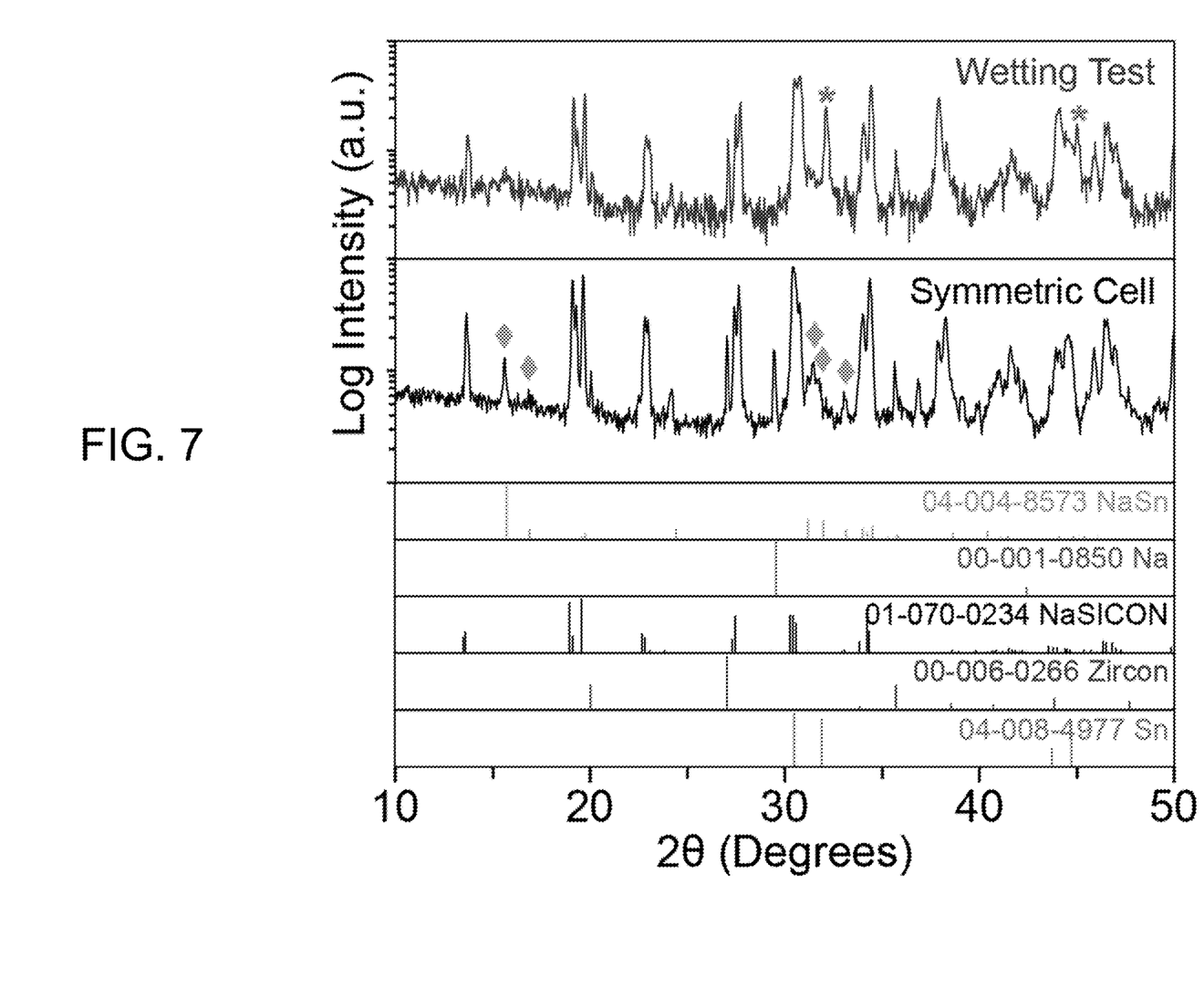
FIG. 7 shows XRD of NaSICON with 700 nm Sn coating after static wetting testing and after dynamic cycling in a symmetric cell compared to database powder diffraction pattern entries. See S. Gates-Rector and T. Blanton, *Powder Diffr.* 34, 352 (2019). Blue stars highlight identifying Sn peaks and orange diamonds highlight identifying NaSn peaks.
Figure 8:
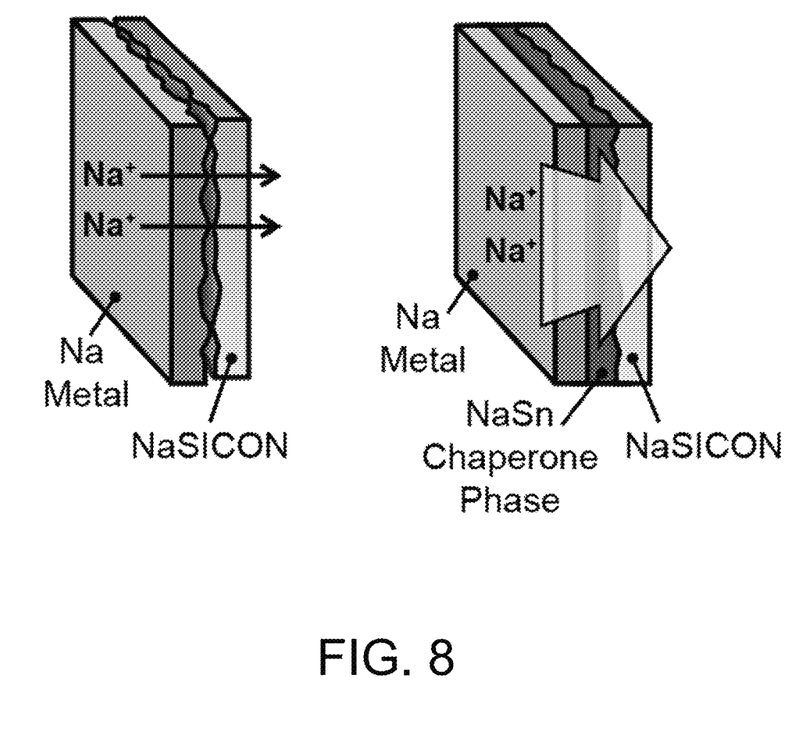
FIG. 8 is a schematic illustration of a Na⁺ ion transport from a Na metal anode through bare NaSICON and enhanced Na⁺ ion transport facilitated by a low resistance NaSn chaperone phase between the NaSICON and the Na metal.

Air-sensitive XRD measurements were taken of the cycled Sn-coated NaSICON to characterize the NaSn chaperone phase. As shown in FIG. 7, XRD reveals the formation of the intermetallic phase NaSn. Identifying NaSn peaks are indicated by the orange diamonds. Based on this evidence, it was concluded that the excess Sn forms a sodium ion-conducting intermetallic phase, as shown in FIG. 8, rather than a blocking layer, on the surface of the NaSICON. No clear evidence of intermetallic formation was detected by XRD for static wetting tests, which may be due to the slow kinetics of sodiation when no bias is applied. See J. S. Gutiérrez-Kolar et al., *ACS Appl. Energy Mater.* 2, 3578 (2018). This further indicates a dynamic formation of NaSn during symmetric cell cycling, rather than a spontaneous sodiation of the Sn simply by contact with the molten Na. Interestingly, though both the 500 nm and 700 nm coating are above the critical thickness, an improvement in the 700 nm coating over the 500 nm coating was seen. While the 500 nm and 700 nm coatings both exhibited excellent wetting, there are still some regions where the NaSICON was not fully wet in the 500 nm coating symmetric cells. This incomplete wetting is likely related to the observed lower performance, possibly due to reduced Sn solubility on less optimally wetted surfaces.

Figure 9:
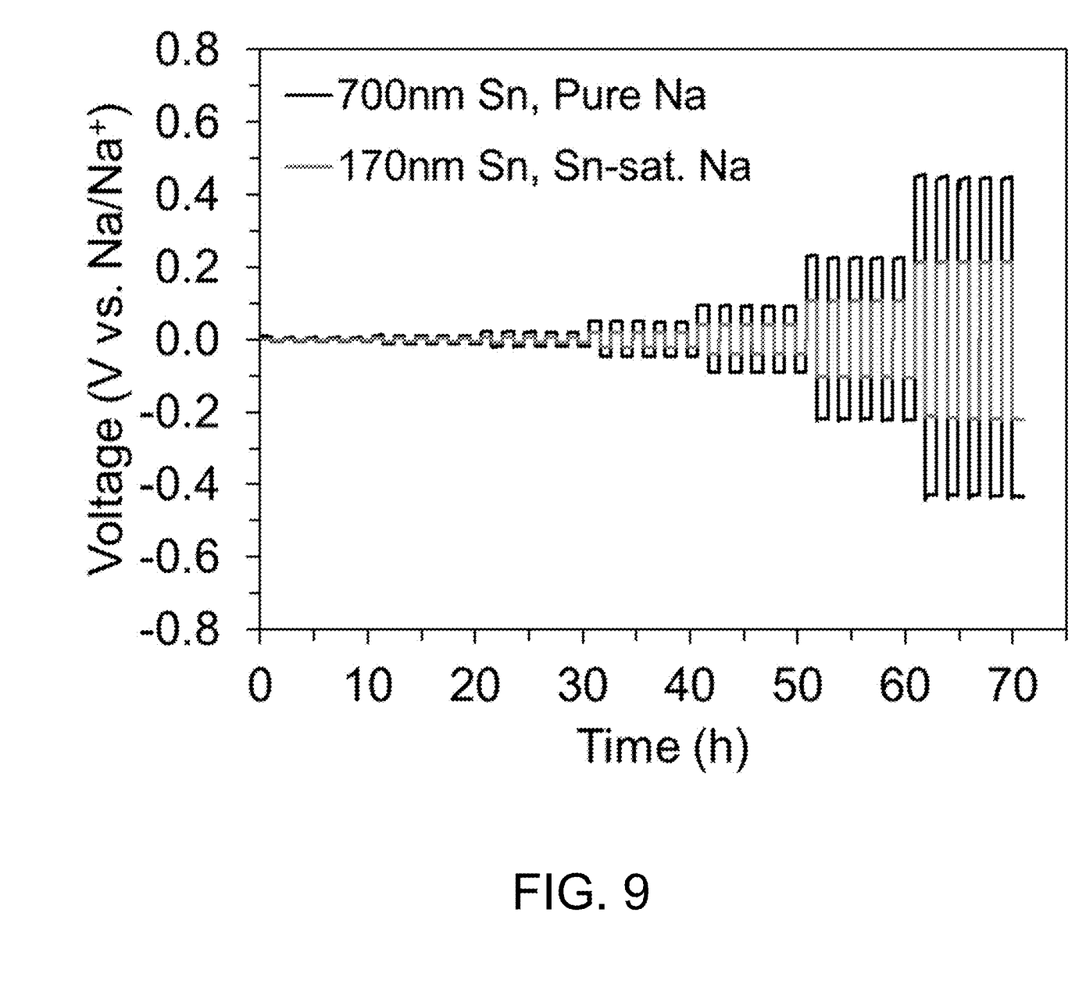
FIG. 9 shows measured voltages of an electrochemically cycled symmetric sodium cell assembled with 700-nm-thick Sn-coated NaSICON and a symmetric sodium cell assembled with 170-nm-thick Sn-coated NaSICON and presaturating the Na anode with Sn.
Figure 10:
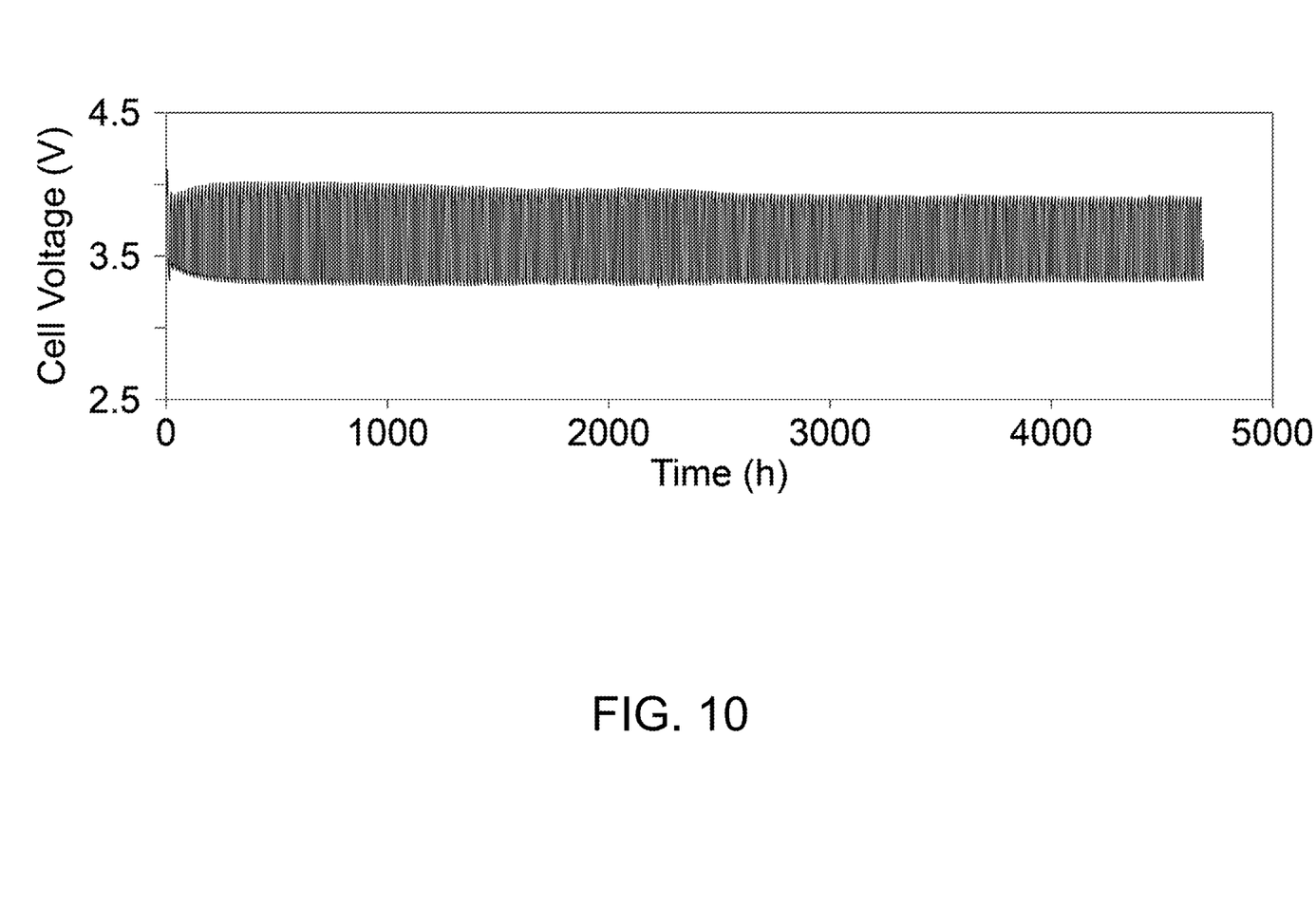
FIG. 10 is a graph showing voltage cycling with full cell comprising a Sn-coated NaSICON separator.

The best performance was achieved with a Na metal anode that was presaturated with Sn. FIG. 9 shows the measured voltages of an electrochemically cycled symmetric sodium cell assembled with 700-nm-thick Sn-coated NaSICON and a sodium cell assembled with 170-nm-thick Sn-coated NaSICON and the Na anode pre-saturated with Sn. The resulting thin NaSn chaperone phase minimizes the series resistance of the cell. FIG. 10 is a graph showing voltage cycling with a full cell having a Sn-coated NaSICON separator. Over 6.5 months of cycling was achieved with the full cell, thereby enabling long battery lifetime.

Other Applications That May Benefit from Improved Sodium Electrochemical Interfaces Although the examples above are directed to improving performance of low temperature molten sodium batteries, similar approaches can be utilized for other molten metal batteries or for other electrochemical applications, such as electrochemical separations and chemical synthesis. The variability of NaSICON composition and application space is diverse, and this process can be applicable to any and all compositions of NaSICON and NaSICON-type materials. Moreover, although the above description highlights the interface between molten sodium and a NaSICON ceramic, the methods and materials described herein can also be applicable to improving the interface between solid-state sodium (not molten) and a NaSICON separator. Below are listed other sodium-based applications that may benefit from the present invention. This list is not meant to be an exclusive description of all possible technological applications of the present invention, but provides examples of specific applications that may benefit from improved sodium electrochemical interfaces:

1. Other molten sodium batteries. The present invention could be applied to other molten sodium batteries including sodium-sulfur, sodium-nickel chloride, and other sodium-metal halide (e.g., iron chloride) molten salts. It could also be used with any other catholyte chemistry paired with a molten sodium or molten sodium alloy anode.
2. Solid state batteries. The present invention could be used below the melting temperature of sodium or its alloys. The coating may provide improved adhesion or electrochemical properties at the anode-separator interface in a solid-state battery, though it may be necessary to pre-form the chaperone phase with a molten sodium-based anode prior to introduction to the solid-state application.
3. Molten sodium upgrading. This process involves reacting sodium with contaminants such as sulfur in oil or fuel stock. The reacted products are then collected and dissolved in a solvent, and then the sodium is electrochemically extracted through the NaSICON membrane, recapturing the sodium and producing elemental or purified sulfur. The use of the present invention could be used to reduce operating temperature or to improve process efficiency at any desired temperature, both resulting in potentially significant economic advantages.
4. Additional Electrochemical Material Purification. The present invention could be used to enable electrochemical reactions: a) where sodium ions are introduced through a NaSICON separator to a catholyte where they react to form a removable contaminant byproduct, or b) where materials contaminated with sodium are purified through the electrochemical removal of sodium through the separator to a metallic sodium (or sodium alloy) anode. Such a process could, for example, be used to remove excess sodium from radioactive waste. See M. S. Fountain et al., *Sep. Sci. Technol.* 43(9-10), 2321 (2008); and D. E. Kurath et al., *Sep. Sci. Technol.* 32(1-4), 557 (1997).
5. Chemical manufacturing or production. For example, the invention could be used to lower the operating temperature or improve the reaction efficiency of processes such as the electrochemical production of aluminum chloride from sodium tetrachloroaluminate. See U.S. Pat. No. 6,235,183 to Putter. Other processes, including organic synthetic reactions that involve sodium reactivity, would benefit from lower temperature operations and higher efficiency charge transport enabled by the present invention. For example, sodium methylate (sodium methoxide) production for biodiesel or pharmaceutical reactions could be enabled by this invention.

6. Harvesting/producing sodium metal or sodium alloys. This invention could be applied to reduce operating temperatures and/or improve efficiencies of processes used to extract purified sodium from contaminated sources. While this process would be analogous to the processes used in oil stock upgrading or removal from waste streams, the goal would be to collect sodium metal through electrochemical reduction of ions passed through a NaS ICON separator.

7. Sodium heat engines. In sodium heat engines, solid-state ion conductors, such as NaS ICON and/or β"-Alumina are used to transport sodium ions oxidized from high temperature sodium vapor (anode) to a lower temperature cathode, where they are condensed and recycled. The present technology could facilitate improved NaS ICON/sodium interfaces, particularly at lower temperature or intermediate temperature interfaces desired for high efficiency operation.

8. Formation of sodium reference electrodes. The invention could be applied to lower the operational temperature or improve the charge transfer efficiency involved in both the manufacture and use of sodium reference electrodes. These materials would be beneficial to basic electrochemical analytical systems or sensor development. See H. Schettler et al., *Appl. Phys. A* 57, 31 (1993).

The present invention has been described as improvement of sodium electrochemical interfaces with NaSICON-type ceramics for improved sodium electrochemical interfaces. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for improving a sodium electrochemical interface, comprising:
   providing a sodium-ion conducting NaSICON-type ceramic having a surface, wherein the NaSICON-type ceramic comprises a three-dimensional hexagonal framework of corner-sharing oxide tetrahedra and octahedra having the basic formula $A_{1+x+y}M'_xM_{2-x}B_yB'_{3-y}O_{12}$, wherein A is a sodium ion occupying interstitial sites, M and M' are multivalent transition metal cations occupying octahedral sites, and B and B' typically are silicon and phosphorous occupying tetrahedral sites, and wherein $0 \leq x \leq 2$ and $0 \leq y \leq 3$;
   depositing a coating comprising tin, bismuth, lead, or antimony on the surface of the NaSICON-type ceramic; and
   forming a sodium ion-conducting sodium-tin, sodium-bismuth, sodium-lead, or sodium-antimony intermetallic phase on the surface of the NaSICON-type ceramic by sodium electrochemical cell cycling at a temperature below the melting temperature of tin, bismuth, lead, or antimony, respectively, thereby providing a sodium electrochemical interface with improved sodium ion conduction from a sodium source through the NaSICON-type ceramic.

2. The method of claim 1, wherein the NaSICON-type ceramic comprises $Na_{1+y}Zr_2Si_yP_{3-y}O_{12}$, wherein $0 \leq y \leq 3$.

3. The method of claim 1, wherein the sodium source comprises sodium metal or a sodium metal alloy.

4. The method of claim 1, wherein the thickness of the tin coating is greater than a critical thickness at which tin, bismuth, lead, or antimony, respectively, exceeds its solubility limit in molten sodium.

5. The method of claim 1, wherein tin, bismuth, lead, or antimony, respectively, is insoluble or sparingly soluble in sodium at a temperature at which the intermetallic phase forms.

6. The method of claim 1, wherein the step of forming comprises coating the surface of the NaSICON-type ceramic with an oxide of a metal, metalloid, or alloy thereof, and forming the intermetallic phase with sodium at a temperature below the melting temperature of the oxide.

7. The method of claim 6, wherein the oxide comprises $Sb_2O_3$ or $GeO_2$.

8. The method of claim 1, wherein the step of forming comprises coating the surface of the NaSICON-type ceramic with a chalcogenide of a metal, metalloid, or alloy thereof, and forming the intermetallic phase with sodium at a temperature below the melting temperature of the chalcogenide.

9. The method of claim 1, wherein the sodium electrochemical interface operates at a temperature less than 200° C.

10. The method of claim 1, wherein the sodium electrochemical interface operates at a temperature greater than 200° C.

11. The method of claim 3, wherein the sodium metal or sodium metal alloy is molten.

12. The method of claim 3, wherein the sodium metal or sodium metal alloy is solid.

* * * * *